Oct. 9, 1962 M. J. MOULTHROP ETAL 3,057,486
CASE STACKING AND CONVEYING APPARATUS
Filed May 11, 1960 8 Sheets-Sheet 1

INVENTORS
Maurice J. Moulthrop
BY Ulrich J. Schmid

Attorneys

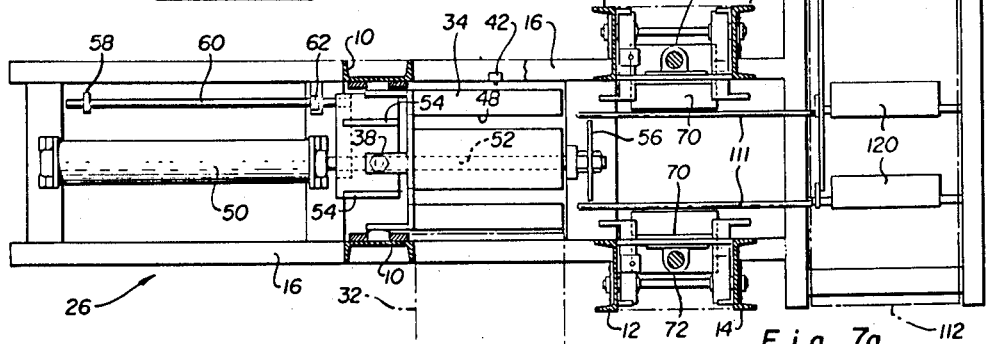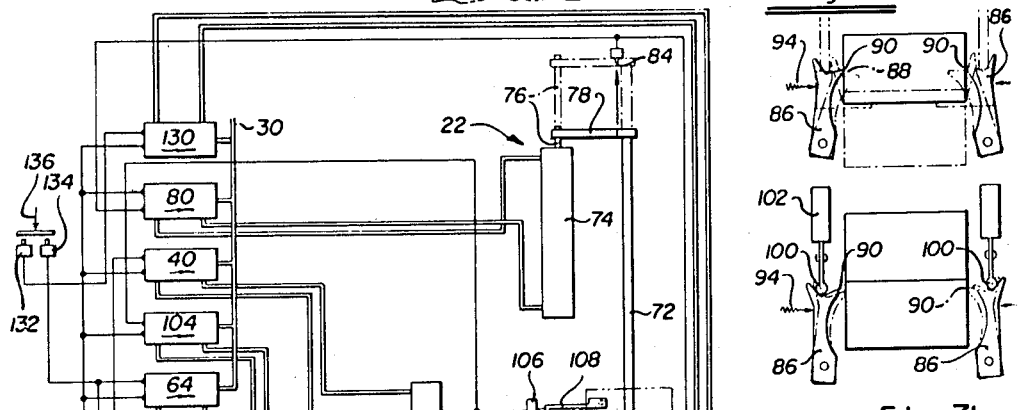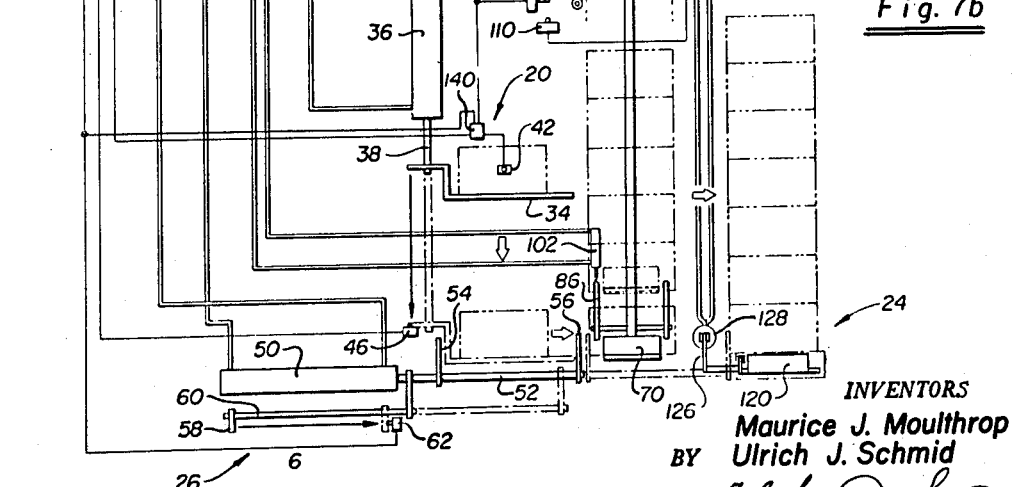

Oct. 9, 1962     M. J. MOULTHROP ETAL     3,057,486
CASE STACKING AND CONVEYING APPARATUS

Filed May 11, 1960                              8 Sheets-Sheet 5

INVENTORS
Maurice J. Moulthrop
BY Ulrich J. Schmid

Attorneys

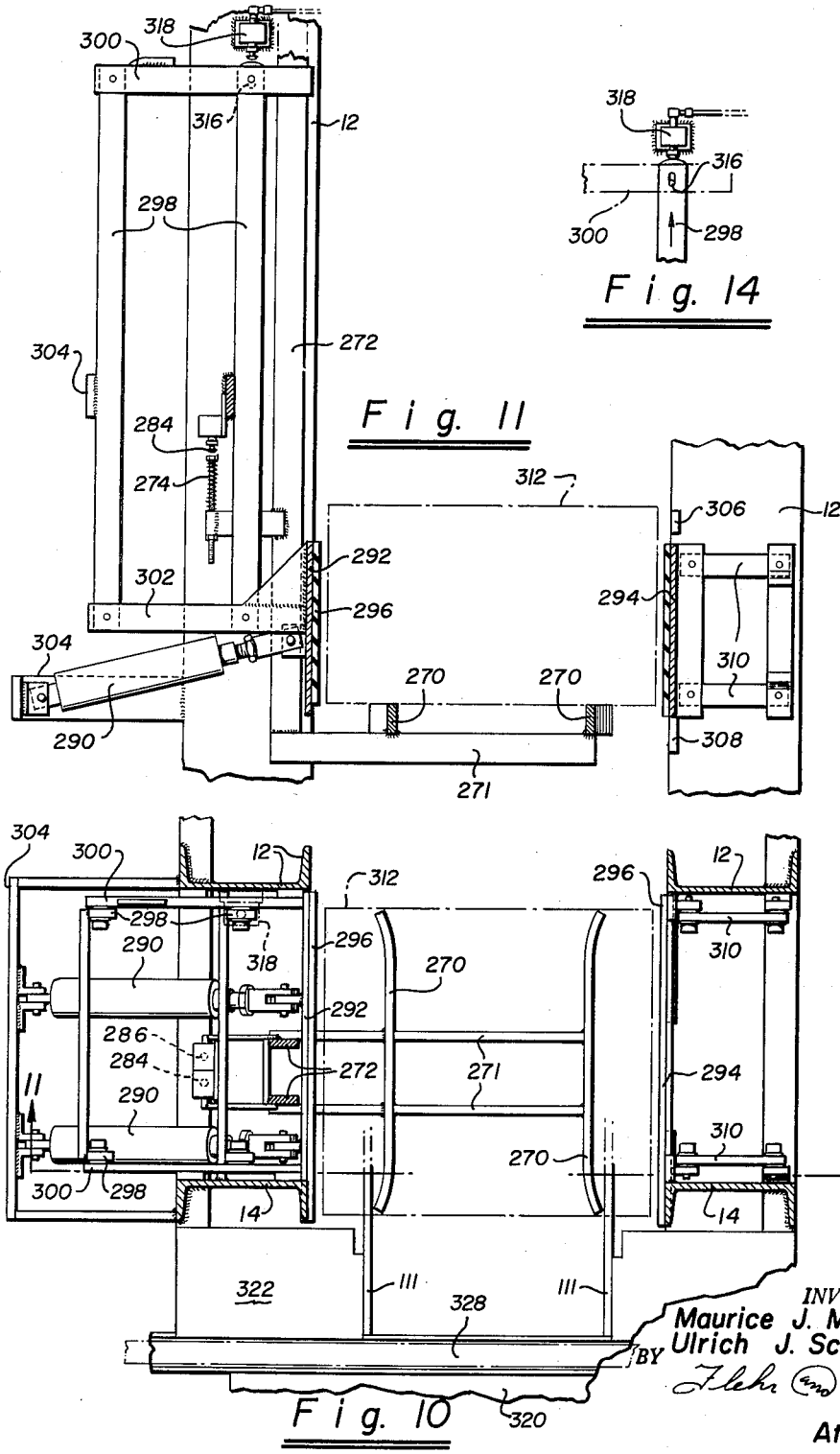

Oct. 9, 1962   M. J. MOULTHROP ETAL   3,057,486
CASE STACKING AND CONVEYING APPARATUS
Filed May 11, 1960   8 Sheets-Sheet 7

INVENTORS
Maurice J. Moulthrop
Ulrich J. Schmid
BY
Attorneys

Oct. 9, 1962   M. J. MOULTHROP ETAL   3,057,486
CASE STACKING AND CONVEYING APPARATUS
Filed May 11, 1960   8 Sheets-Sheet 8
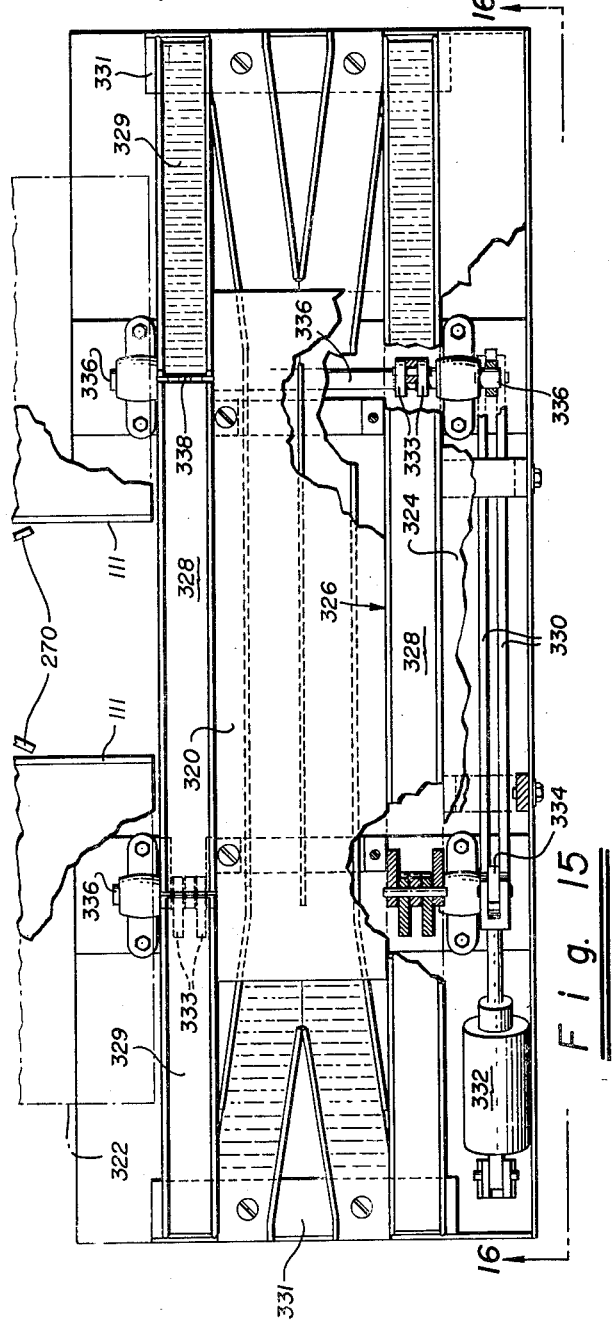
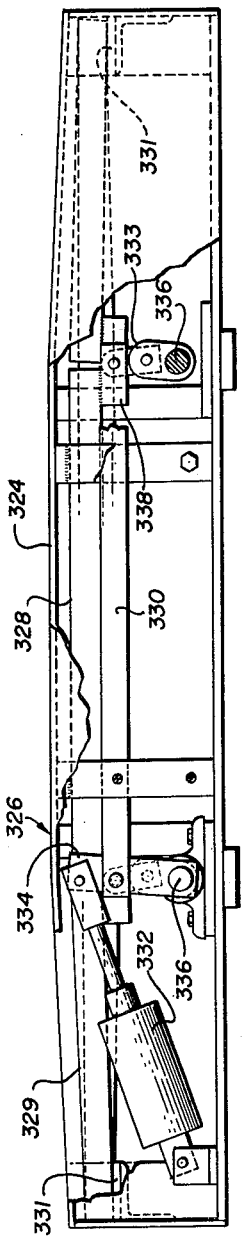
INVENTORS
Maurice J. Moulthrop
BY Ulrich J. Schmid
Attorneys

United States Patent Office 3,057,486
Patented Oct. 9, 1962

3,057,486
CASE STACKING AND CONVEYING APPARATUS
Maurice J. Moulthrop, Oak Park, Ill., and Ulrich J. Schmid, Dallas, Tex., assignors of one-half to The Creamery Package Mfg. Company, Chicago, Ill., a corporation of Illinois, and one-half to Foremost Dairies, Inc., San Francisco, Calif., a corporation of New York
Filed May 11, 1960, Ser. No. 28,264
9 Claims. (Cl. 214—6)

This invention relates to case stacking and conveying apparatus, and is particularly concerned with machines of this character which are compact, light in weight and require a minimum of space.

Case stacking machines conventionally used, for example in the dairy, citrus and bottling industries, generally employ a pit to house various portions of the mechanism such as the hydraulic mechanism for the elevator, conveyor mechanism, etc. Stacking machines of this type have a number of shortcomings. Principal among these are increased initial cost and an inflexibility of use of the mechanism in subsequent operations. Changes in the positioning or use of the stacking mechanism, such as are frequently encountered in modernization and revamping programs, are consequently accomplished only with difficulty and at great expense. This is a particular handicap to small concerns with limited resources, where multiple use of purchased equipment is often essential.

In general, it is an object of the present invention to provide a case stacking and conveying mechanism which efficiently receives and arranges successive cases in vertically stacked relation, and which does so quickly, easily and automatically.

It is a further object of the invention to provide a case stacking and conveying mechanism that is simple in construction, light in weight, and which occupies a minimum of floor space.

Another object of the invention is to provide a mechanism of this type which can be readily positioned in a plant operation to receive single cases from a case feeding line at working height, which will arrange such cases in stacked relation at floor or shipping level, and then deliver the stacked assemblies at such level for further conveyance in a substantially automatic fashion.

Other objects and advantages of the invention will be apparent from the following description of a preferred embodiment thereof as illustrated in the accompanying drawing, in which:

FIGURE 4 is a view in transverse section along the line 4—4 of FIGURE 2;

FIGURE 6 is a view in transverse section along the line 6—6 of FIGURE 2;

FIGURES 7a and 7b are schematic views illustrating the operation of the apparatus indicated at 7—7 of FIGURE 4;

FIGURE 8 is a schematic view of the machine of FIGURES 1 to 7 illustrating the operation thereof.

FIGURE 10 is a view in transverse section along the line 10—10 of FIGURE 9;

FIGURE 11 is a view in vertical section along the line 11—11 of FIGURE 10;

Figure 12A:
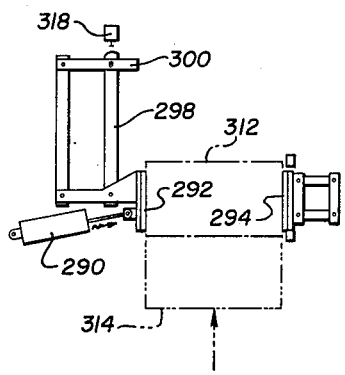
Figure 12B:
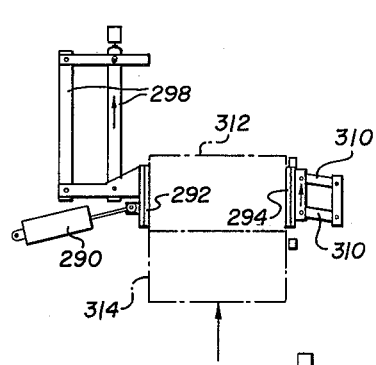
Figure 12C:
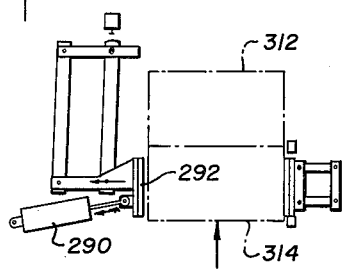
Figure 13:
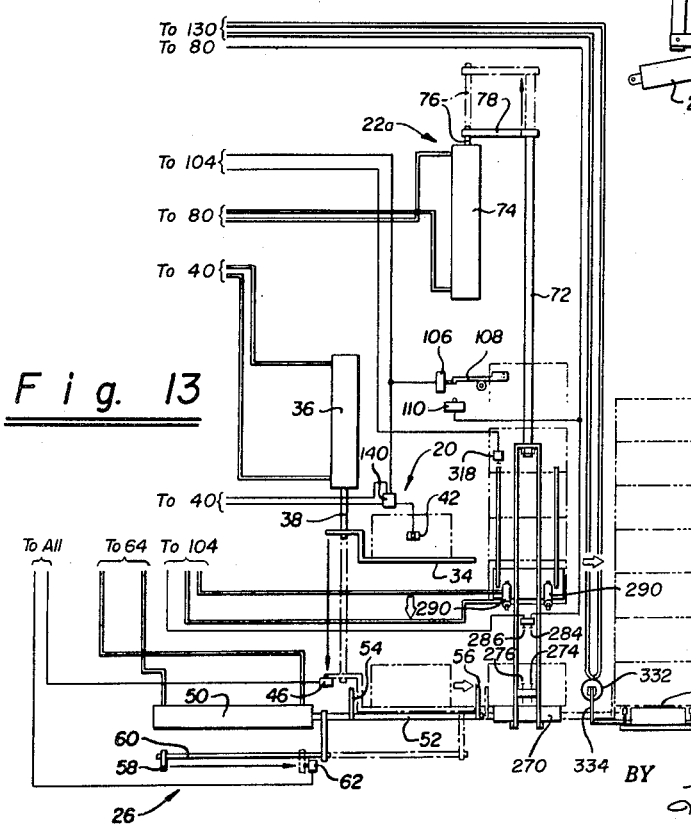

FIGURES 12a, 12b, and 12c are schematic views illustrating the operation of the apparatus shown in FIGURE 11;

FIGURE 13 is a schematic view, related to FIGURE 8, illustrating the operation of the modified mechanism;

FIGURE 14 is a detail view of a portion of FIGURE 11, showing a particular stage in operation of the modified mechanism;

FIGURES 15 and 16 are views in plan and section of the stack conveying or discharge portion of the modified mechanism.

In general, the case stacking and conveying mechanism of the instant invention operates in conjunction with a filling machine wherein cases are filled with merchandise and discharged upon a conveyor. By way of illustration, the mechanism is adapted to operation adjacent a casing machine wherein cartons or bottled goods are placed in the cases. The machine performs the function of receiving the filled cases and elevating them into a stack, with each new case being successively positioned at the bottom of a stack being formed. When a desired number of cases have been arranged in a stack, the machine then causes the assembled stack to be discharged as a unit onto a discharge conveying mechanism. At the same time, a new case is fed into the stacking mechanism to initiate the forming of a new stack. In a preferred embodiment of the machine, the individual cases are received at working level (e.g. about 3 feet above the floor) and are lowered into position adjacent the stacking mechanism, which operates to stack the cases and to deliver the same at a convenient stack handling level (e.g. about 8 to 20 inches above the floor).

Figure 1:
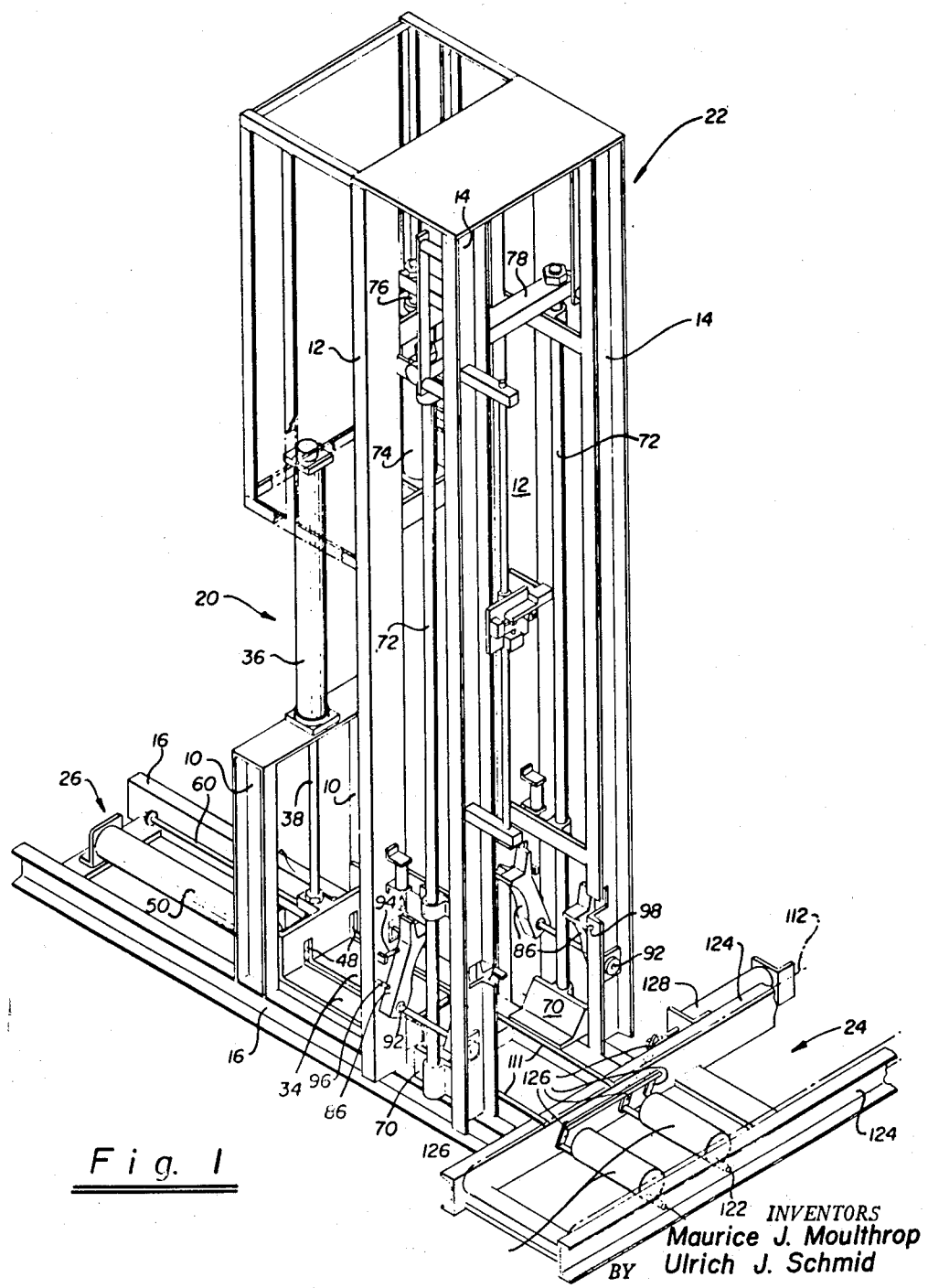
FIGURE 1 is a view in perspective of one embodiment of a unitary case stacking and conveying mechanism in accordance with the invention.
Figure 3:
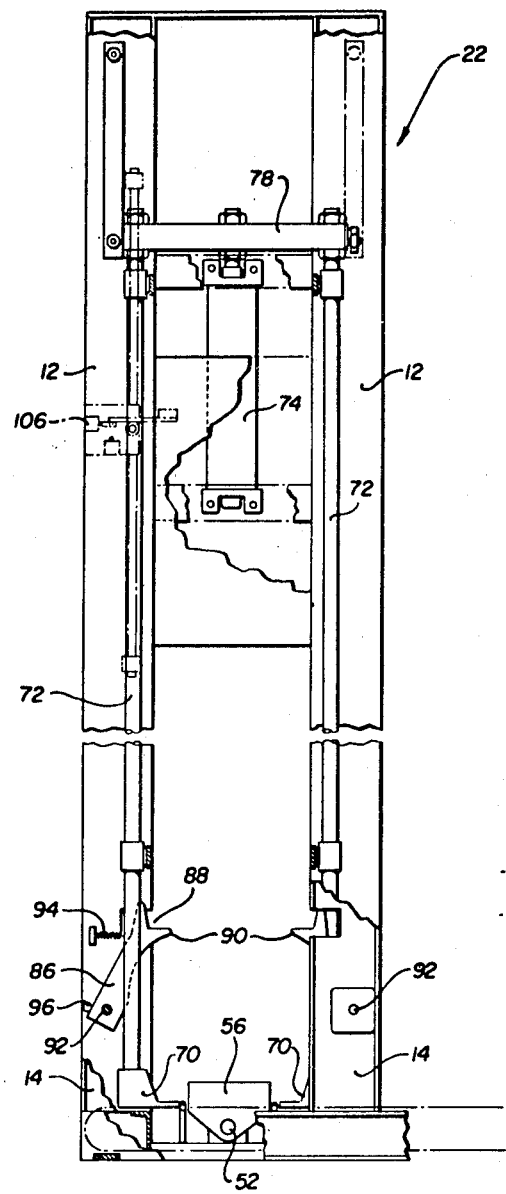
FIGURE 3 is a view in end elevation and section, taken from the right hand of FIGURE 2.
Figure 5:
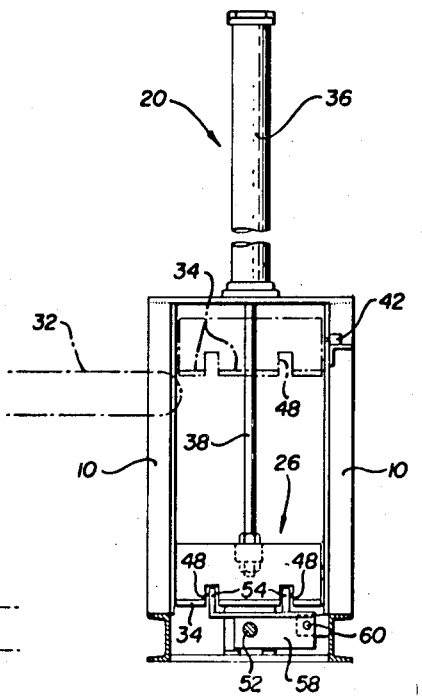
FIGURE 5 is a view in vertical section along the line 5—5 of FIGURE 2.

The illustrated mechanism generally comprises a frame including respective side frame members 10, 12 and 14 (FIGURES 1 and 3) which are connected together by cross bracing members, and which are all supported upon a bottom transverse frame including the side rails 16. The frame provides a mounting for means forming various operation sub-assemblies of the mechanism, specifically a loading section 20 including a loading elevator, a stacker section 22 including a stacking elevator, a stack discharge section 24 including a discharge elevator, and a pusher ram 26 adapted to operate in synchronized relationship with the various elevators. As will be described, the machine functions to receive cases in succession from the casing or filling station. These cases are successively lowered by the elevator in the loader section 20 to a position in front of the pusher ram. The ram then successively pushes the cases into the elevator of the stacker mechanism, where they are arranged into a stack. When a stack of a predetermined number of units, or vertical dimension, is formed, it is lowered by the stacker elevator and pushed by the ram onto the elevator of the discharge section 24. The latter deposits the stack on a discharge conveyor from whence it is carried to a shipping dock, or to other desired plant locations.

The machine illustrated in FIGURES 1 to 8 is designed for operation in conjunction with a pneumatic system employing compressed air or other gaseous fluid. Fluid pressure is supplied from the power cylinder (not shown) to the main supply line 30 (FIGURE 8) and at a constant pressure. This line supplies pressure to the various operating cylinders of the machine in a manner later described. The machine can also be designed to operate in conjunction with a hydraulic system in which oil, water or other liquid is employed as the hydraulic fluid.

*The Loading Section*

The loading section 20 (FIGURES 1, 2 and 5) includes a loading or feed conveyor 32 which is adapted to move cases successively into the machine from a previous operation, for example, a case filling operation. In general, such conveyor is at a convenient working height adapted to facilitate such prior operation. The function of the conveyor 32 is to deliver the cases to the platform of a loading or stepdown elevator associated with the loading section.

The loading elevator comprises a platform 34 which is mounted for vertical movements by means of the air cylinder 36 and piston rod 38. As illustrated in FIGURE 8, the air cylinder 36 is actuated by the selector valve 40 upon a signal from the switch 42. The switch 42 in turn is energized by movement of a case onto the platform 34 by the loader conveyor 32. In other words, the placing of the case on the loader elevator automatically sends it down to a loading position in front of the air ram 26, as illustrated in the full line positions of FIGURES 1 and 2.

It will be noted that the rod 38 of the loader elevator carries an adjustable actuator 44 which is adapted to engage a switch 46 for the air ram in a down position of the elevator. Referring to the elevator platform itself, it will be seen to include cutaway portions or channels 48 to receive pusher portions of the air ram.

*Synchronizing Pusher Ram*

The synchronizing ram 26 (FIGURES 1 to 3, 5 and 6) includes an operating air cylinder 50 and pusher rod 52 mounting a pair of rear or "loading" pusher bars 54 and a forward or "discharge" pusher plate 56. The pusher bars 54 are mounted above the rod 52 so as to pass lengthwise of the channels 48 of the loading elevator 34 when the latter is in lowered position. This construction permits the air ram 50 to discharge a case from the loading elevator onto the elevator of the stacking section 22. It also prevents any interference between the operation of the loading elevator and air ram, which are free to operate independently.

The air ram 26 also functions to discharge a formed stack from the stacker section onto the conveyor of the discharge section 24. This is accomplished by pressure of the pusher plate 56 against the bottom case of the stack to move it off the stacker elevator onto the discharge conveyor, as will be later described.

The synchronizing ram 26 is additionally provided with an actuator 58, carried by the rearwardly extending rod 60, which is adapted to engage the air switch 62 in a fully extended position of the air ram. As shown in FIGURE 8, the switch 62 energizes each of the selector valves to initiate a number of different operations. Specifically it energizes the selector valve 64 to retract the pusher ram 26. It also energizes the selector valve 40 to raise the elevator 34 of the loader section. It additionally energizes various elevator mechanisms in the stacker section 22 and the discharge section 24. These various synchronized operations will be fully described hereinafter.

*The Stacker Section*

The stacking section 22 (FIGURES 1 to 4, 6 and 7) includes a stacking elevator which elevates the cases in the formation of a stack, and case engaging means for supporting the stack as it is progressively formed from below. The particular case engaging mechanism will depend to some extent on the intended use of the machine. The stacking section also includes switch means operable when a stack reaches a given height to release the case engaging means and to lower the elevator with the stack thereon into a position before the pusher ram 26. The ram can then operate to discharge the stack as a unit into the discharge section 24.

In the machine of FIGURES 1 to 8, the stacking elevator comprises a pair of spaced apart edge supports 70, supported by the vertically extending rods 72. The rods 72 are mounted for vertical movement by the air cylinder 74, piston rod 76, and transverse yoke 78. As represented in FIGURE 8, the air cylinder 74 is actuated by the selector valve 80 upon a signal from the switch 62. The switch 62, as previously noted, is energized by the actuator 58 of the air ram as the latter pushes a case onto the stacking elevator sections 70. In short, the operation of placing a case on the stacking elevator automatically causes it to be sent upward in a stack forming movement.

Figure 2:
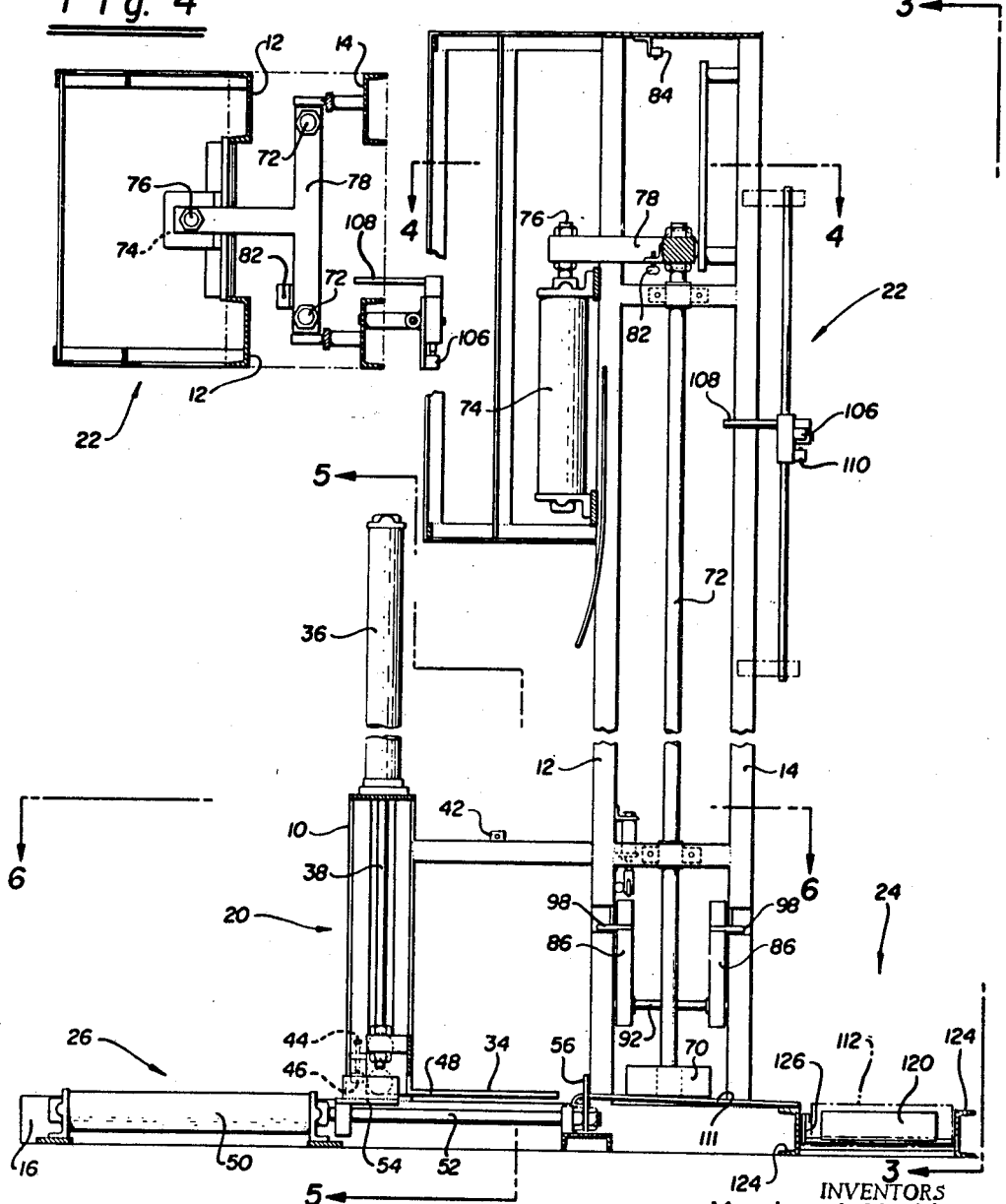
FIGURE 2 is a view in vertical section therethrough.

As best illustrated in FIGURE 2, the yoke 78 of the stacking elevator carries an adjustable actuator 82 which is adapted to engage a switch 84 in the uppermost position of the elevator. This switch acts to reverse the operation of the selector valve 80 to return the stacking elevator to the down position, to receive the next case in succession (FIGURE 8).

The case engaging means serves to support a stack as it is formed, but without preventing movement of additional cases into the stack from below. In the embodiment of FIGURES 1 to 8, such means comprise elongate pawls 86 pivotally mounted on the supports 92 and terminating in the case supporting recesses 88. The pawls 86 are urged inward by springs 94 so that projections 90 on the pawls normally protrude into a supporting position within the stacker. During a stacking operation these projections are adapted to be engaged by a case moving upward into the stacker to pivot the pawls outward, as illustrated schematically in FIGURE 7a. Stops 96 and 98 are provided to limit inward and outward pivotal movements of the pawls 86.

As will be apparent from the foregoing, each case being elevated by the supports 90 will act to pivot the pawls out of the way. However, once the case has passed the pawls, the springs 94 will return the projections 90 to a normal position, projecting into the stacker. As the stacking elevator moves downward in response to actuation of the switch 84, the projections 90 will lift the cases off the separated supports 70, and hold them in supported position within the stacker frame. In this way successive cases can be placed at the bottom as the stack is formed, and the stack retained in supported position on the pawls.

When the stack being formed reaches a given height (determined by the desired number of cases in a stack) the stacking elevator is permitted to lower the formed stack into position in front of the pusher plate 56 for movement into the discharge section 24. The pivoted latched means 86 are also positively held in retracted position so as to insure a free descent of the stack.

Referring to the schematic representation in FIGURE 7b, stops 100 are provided to hold the pawls 86 in a retracted position. These stops are mounted for vertical movement by means of the air cylinders 102 which are secured to the frame above the pawls. As shown in FIGURE 8, the air cylinders 102 are actuated by the selector valve 104 upon a signal from the switch 106. The switch 106 is normally held in a depressed position by the pivoted lever arm 108 to retract the stops.

The lever 108 has a portion which projects into the area immediately above the stack being formed. When the stack reaches a given height, which preferably occurs at the moment the last case starts its elevation into the stack, the lever 108 is contacted and rotated in a counterclockwise direction (FIGURE 8). This releases the switch 106 and at the same time energizes the switch 110.

It will be noted that the lever arm 108 is adjustably positioned on the standard 109. This permits regulation of the stack height which will function to operate the lever 108. For convenience, the standard can be marked to indicate positions of the lever arm corresponding to stacks of a desired height or a predetermined number of cases.

Contact of the lever arm 108 by a stack produces a number of simultaneous effects. By energizing switch 110, it causes the selector valve 80 to lower the stack elevator independently of the switch 84. The stack thus starts its downward movement almost immediately following entry of the last case into the stacker. The lever arm also releases the switch 106, causing the stops 100 to drop into the recesses 88 of the pawls at such time as they are pushed aside by contact with the entering case. The recesses 88 are so designed that the stops 100 act to overcome the pressure of the springs 94, causing the pawls to be pivoted outward to prevent any contact of the projections 90 with the descending stack (FIGURE 7b). The release of switch 106 also de-energizes the switch 42 controlling the loading elevator 34, for a reason to be later explained.

The stack is now free to be lowered into position before the discharge plate 56 of the pusher ram 26. Upon an outstroke of the pusher ram 26, a completed stack is pushed along the rails 111 into the discharge section 24.

The Discharge Section

The discharge section 24 (FIGURES 1, 2 and 8) includes a discharge or delivery conveyor 112 (FIGURE 1) which is adapted to receive the completed stack for further distribtuion, for example, to a loading dock for delivery into rail cars, vans, etc. To prevent toppling of the stack as it is moved on the conveyor, a discharge elevator section can include an elevator adapted to gradually deposit the stack on the conveyor 112.

The discharge elevator illustrated in FIGURES 1 to 8 comprises a pair of eccentric cylinders 120 mounted for rotation on the spindles 122. The spindles in turn are mounted between supporting rails 124 for the discharge conveyor 112, which may be of the conventional double chain type. The cylinders 120 can be positioned between the separate chains of the conveyor.

The cylinders are mounted for eccentric rotation about the spindles 122 by the cranks 126. The cranks 126 rotate the cylinders 120 between raised and lowered positions in response to actuation of the air cylinder 128. It will be noted that the cylinders 120 are in line with the discharge rails 111 of the stacker section. Consequently, in a raised position, the cylinders are adapted to slidingly receive a stack being discharged from the stacker section.

Referring to FIGURE 8, the air cylinder 128 is actuated by the selector valve 130 upon a signal from the switch 132. This switch is preferably a hand switch which is adapted to operate simultaneously with the switch 134. The latter switch permits the independent operation of the pusher ram 26 to discharge the completed stack from the stacker section 22. In other words, simultaneous operation of the switches 132 and 134 (as represented by the arrow 136), will cause the eccentric cylinders 120 to be rotated into a raised position between the discharge conveyor chains and the stack to be discharged from the stacker elevator lengthwise along the surface of the cylinders 120. The stack is thus held out of contact with the discharge conveyor during the stack discharging operation.

The desired independent operation of the ram 26 to discharge a stack requires that the switch 42 controlling the loading elevator be de-energized, otherwise the elevator's next descent will automatically actuate the ram through the switch 46. As illustrated in FIGURE 8, the switch 42 is rendered inoperative by the interrupter 140, which in turn is actuated by contact of the stack being formed with the lever arm 108. Discharge of the completed stack can now be accomplished only by manual operation of the switch 134.

Upon reaching a fully extended position, the actuator 58 of the air ram engages the switch 62. This switch serves to energize the selector valve 130 to rotate the eccentric cylinders 120 to a lowered position, thereby depositing the stack on the discharge conveyor 112. The switch 62 also energizes the other selector valves to retract the pusher ram 26, to disengage the pawl stops 100, to raise the loading platform 34, and to initiate upward movement of the supports 70 of the stacker elevator. It also de-energizes the interrupter 140 so that the loading elevator can again be controlled by the switch 42.

Operation

Reviewing briefly the operation of the machine illustrated in FIGURES 1 to 8, filled cases at working or filling height are delivered in succession to the loading section 20 by the feed conveyor 32. Contact of a case with the switch 42 lowers the loading platform 34 into position before the pusher bars 54 of the air ram 26. Contact of the loading elevator with the switch 46 similarly energizes the air ram 26. Forward movement of the air ram initiates formation of a stack by moving a case off the loading platform 34 onto the separated supports 70 of the stacker elevator. It also causes the actuator 58 to energize the switch 62. The switch 62 actuates the selector valve 64 to retract the air ram 26, the selector valve 40 to raise the loading platform 34 into position to receive a new case, and the selector valve 80 to raise the stacking elevator and received case in the formation of a stack. The switch 62 also de-energizes the pawl stops 100 and maintains the eccentric cylinders 120 in lowered position within the discharge conveyor.

The aforementioned operations are repated in succession with each new case being positioned at the bottom of a stack being formed in the stacker section 22. When a desired number of cases has been received and arranged into a stack, the top case in the stack is caused to contact the lever 108 to actuate the switches 106 and 110. The switch 106 energizes the selector valve 104 to extend the pawl stops 100 into the recesses 88 of the pawls, causing them to be pivoted out of contact with the stack. The switch 106 also de-energizes the switch 42 controlling the loading elevator. The switch 110 simultaneously energizes the selector valve 80 to reverse the movement of the stacker elevator, and to lower the stack into position before the pusher plate 56. The operator can now energize the switches 132 and 134 to discharge the completed stack onto the discharge conveyor 112. In this operation, the switch 132 energizes the selector valve 130 to rotate the eccentric cylinders 120 into raised position to receive a stack. The switch 134 energizes the air ram 26 to shove the completed stack onto the cylinders in raised position.

At such time as the operator initiates outward movement of the air ram to discharge a stack, the switch 62 is energized to retract the air ram, lower the stack on the conveyor, retract the pawl stops 100, raise the stacking elevator, energize switch 42 to permit the automatic formation of a new stack, and to raise the loading platform 34 to receive a new case from the feed conveyor 32. The full cycle of the machine has now been completed.

Modified Stacker Section

FIGURES 9 to 14 illustrate a modified stacker section 22a in which the case engaging means is adapted to positively grip the lowermost case and to positively release the same as the stack is formed from below. Such construction has the advantage of facilitating the handling of wire or other open frame type cases.

As best seen in FIGURES 10 and 11, the stacking elevator in the modified apparatus comprises a unitary open frame platform including spaced apart rails 270 mounted on the transversely extending supports 271. The latter are rigidly secured to the vertically extending lift member 272 and rod 273, operated by the lift cylinder 74. As represented in FIGURE 13, the lift cylinder 74 is energized by the selector valve 80 (not shown) to elevate the stacking platform upon a signal from the switch 62. This sequence can be the same as previously described with reference to FIGURE 8. More precisely, operation of the air ram 50 to move a case into the stacking section 22a actuates switch 62 to send the stacking elevator upward in a stack forming movement.

Figure 9:
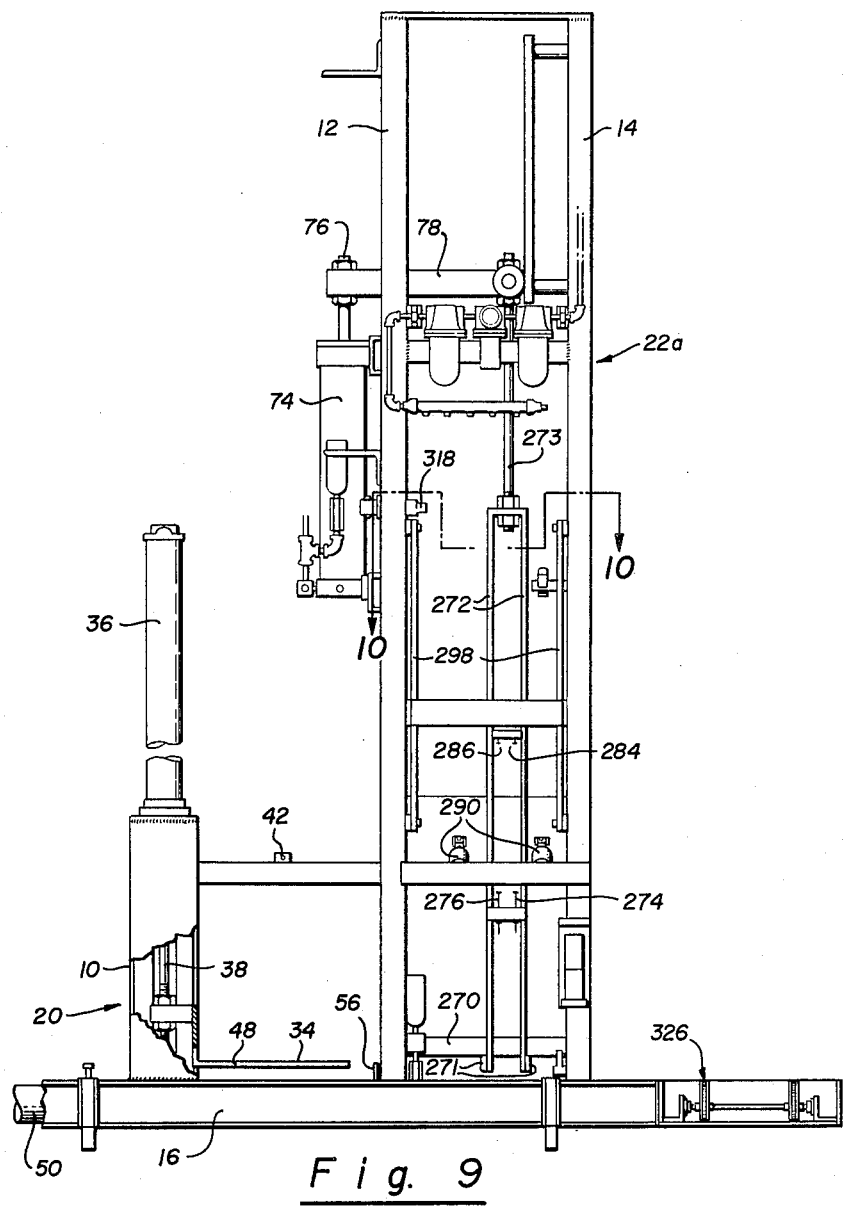
FIGURE 9 is a side elevational view, similar to FIGURE 2, illustrating a modified mechanism according to the invention.

Referring to FIGURE 9, the lift member 272 carries a pair of adjustable actuators 274 and 276 which are adapted to engage stationary switches 284 and 286 in an uppermost position of the elevator. The switch 284 functions to reverse the operation of the selector valve 80 to return the stacking elevator to the down position for receipt of the next case in the stacking operation. The switch 286 functions to energize clamping cylinders 290 to positively grip and hold the case in elevated position, as will be hereinafter explained.

Referring to FIGURE 11, the modified case engaging means comprises a pair of gripper or pressure plates 292, 294 preferably faced with rubber or similar deformable resilient material 296. The plate 292 is mounted for lateral movement by pairs of swing arms 298 suspended in parallel fashion on laterally extending arms 300 carried by the frame members 12 and 14. At their lower ends these swing arms are pivotally connected to support arms 302 for the pressure plate. Lateral movement of the swing arms and the pressure plate 292 is obtained by the air cylinders 290, which are pivotally connected between the pressure plates and the cross frame 304. The opposite pressure plate 294 is restrained from moving laterally, but is permitted to move vertically between the upper and lower stops 306 and 308. This movement is permitted by a simple parallelogram linkage between the plate 294 and the frame members 12, 14 provided by the pivot arms 310.

FIGURE 11 illustrates the first stage in the operation of the modified stacking mechanism, showing a case 312 being elevated to a position between the pressure plates, just prior to contact of the switches 284 and 286 by the actuators 274 and 276. Actuation of the switch 286 causes the air cylinders 290 to swing the arms 298 and pressure plate 292 inward into engagement with the case, forcing it against the opposite pressure plate 294, as schematically represented in FIGURE 12a. The switch 284 simultaneously returns the stacking platform 270, 271 to the down position to receive the next case in the stacking operation. As the next case 314 is elevated into position it engages the lower surface of the case 312 (FIGURE 12a) causing an upward movement of the first case 312 and also the pressure plates 292, 294 (FIGURE 12b). The movement of the plate 292 is accommodated by means of slots 316 and the upper ends of the forward swing arms 298, permitting one of the latter to engage a switch 318, controlling operation of the air cylinders 290 (FIGURES 13 and 14). The switch 318 acts to reverse the operation of the cylinders 290, causing the pressure plate 292 to be retracted (FIGURE 12c). The stacking elevator is thereby freed to elevate both case 312 and case 314 until such time as the actuator 276 again engages switch 286, causing the cylinders 290 to actuate the pressure plates to grip the case 314. The stacking sequence is now complete with the new case 314 firmly clamped in stack supporting position.

The operations just described are repeated in succession with each new case being positioned at the bottom of the stack between the pressure plates 292 and 294. When a desired number of cases has been formed into a stack, the top case in the stack can be caused to contact a lever 108 to actuate switches 106, 110, for example as previously described in connection with the device of FIGURES 1 to 8. In this instance, however, the switch 106 energizes the selector valve 104 to cause positive retraction of the clamping cylinders 290 to free the stack. The switch 110 simultaneously energizes the selector valve 80 to reverse the movement of the stacking elevators, to lower the stack into position before the pusher plate 56 of the air ram 50. The operator can now depress the switch 136 to discharge the completed stack onto the discharge conveyor, as before (FIGURE 8).

The modified stacker section has the advantage of positively gripping each new case positioned at the bottom of the stack, to hold the stack in elevated position. As a new case moves upward in the stacker the squeeze plates 292 and 294 are positively released from the stack, allowing the stack to move upward, following which the plates are again urged into contact with the stack to positively grip and support the stack. This feature of the modified mechanism results from the operation of the case engaging mechanism to release itself upon upward movement of the stack so as to be operable at a predetermined elevation of the stacking elevator to again grasp the lowermost case in the stack.

*Modified Discharge Section*

FIGURES 15 and 16 illustrate a modification of the discharge section whereby a stack being discharged from the stacker elevator by the air ram 50 is moved directly onto a stable, rigid discharge platform positioned between the chains of the discharge conveyor 112. The chains of this conveyor are positioned on lifts or hoist mechanisms, generally indicated at 326, which are operable to lower the chains during discharge of the stack, and to thereafter raise the chains for conveyance of the stack.

As shown in FIGURE 15, the discharge platform comprises a main platform 320 positioned between the chain lifts and smaller platforms 322 and 324 positioned alongside the chain lifts. These provide a substantial, level support for a stack being moved along the stacker rails 270 and 111 onto the platform.

The lift mechanisms 326 generally comprise a pair of trough-like chain hoists including intermediate portions 328 and articulated end portions 329. Cross frames 331 slidably support the free ends of the articulated portions 329. The chain hoists are mounted for limited vertical movement by cranks 333 linked to the hoists and rigidly secured to the cross shafts 336. The latter are rotated to raise or lower the hoists through the action of the air cylinder 332, levers 334, and connecting rods 330. As best seen in FIGURE 16, the articulated joints 338 of the hoists are slidably supported on the upper ends of the cranks 333. The chain hoists are thus freely movable to raise or lower the chains of the discharge conveyor upon actuation of the air cylinder 332.

Referring to FIGURE 13, the air cylinder 332 is actuated by the selector valves 130 upon a signal from the switch 136. The operation can be similar to that described in connection with FIGURE 8, except in this instance the switch 136 causes the cylinder 332 to lower the chain hoists simultaneously with actuation of the selector valve 64 and air ram 50 to discharge a formed stack. The stack is thus discharged from the stacker elevator, onto the surface of the platform 320—324, at a time when the chain is depressed below the surface of this platform. As the air ram 50 reaches the end of its stroke, the actuator 58 engages switch 52, causing the selector valve 130 to reverse so that the cylinder 332 retracts to raise the chain hoists. The chains are consequently raised above the level of the discharge platform into a position of conveyance with respect to the formed stack. The switch 62 also energizes the selector valve 64 to retract the pusher ram, the valve 40 to raise the loading platform 34, the valve 104 to retain the plates 292, 294 in retracted position, and the valve 80 to raise the stacking elevator to initiate formation of a new stack, substantially as previously described in connection with FIGURE 8.

Each system of apparatus described above is designed to permit the operator to control the moment of actual discharge of a formed stack onto the discharge conveyor 112. The described operation is therefore semi-automatic. In general, such operation is to be preferred, particularly where the stacking and conveying mechanisms are to be positioned at several different positions along a single discharge conveyor line. In bottling operations, for example, it is desirable that the cases filled with bottles or cartons be immediately assembled into a stack following the case filling operation, and prior to further conveyance. This permits a simplified plant operation employing a single discharge conveyor in conjunction with a plurality of filling stations. It is advantageous, therefore, that the stack operator be able to control the exact moment of discharge of a stack onto a discharge conveyor, since this avoids the use of expensive controllers to synchronize the operation of the various stacking machines.

In situations where fully automatic operation is desired, the switch 132 can be mounted to operate simultaneously with the switch 46, which controls outward movement of the ram 26. This permits the cylinders 120 or the cylinder 332 to be automatically positioned to permit discharge of a stack from the stacker section. In this modified version of the control system, the manual switch 134 and interrupter 140 can be eliminated. It should consequently be understood that the invention, although illustrated and described in connection with a preferred embodiment thereof, is capable of considerable variation and modification within the scope of the claims appended hereto.

We claim:

1. In case stacking apparatus, stack forming means including a stacking elevator, pressure pads on opposite sides of said stack forming means, means responsive to upward movement of said stacking elevator to cause said pads to grip a case positioned therebetween, additional means responsive to upward movement of said pads to cause said pads to release said case, whereby said pressure pads are caused to alternately grip and release the lowermost case in the formation of a stack.

2. In case stacking apparatus, stack forming means including a stacking elevator, pressure pads on opposite sides of said stacking elevator, means responsive to movement of said stacking elevator to actuate said pressure pads to engage and support the lowermost case in the formation of a stack, means mounting said pressure pads so as to be movable therewith upon upward movement of a new case into the stack, and means responsive to upward movement of the mounting means to disengage said pads prior to actuation of the same to engage and support said new case.

3. Case stacking apparatus as in claim 2 wherein said means mounting the pressure pads includes a swing arm adapted to moving a pad between case engaging and supporting and disengaged non-supporting positions.

4. Case stacking apparatus as in claim 3 wherein said swing arm is provided with a slot adapted to accommodate upward movement of said mounting means for the pressure pads.

5. Case stacking apparatus as in claim 2 wherein said mounting means includes a parallelogram linkage.

6. In a unitary case stacker adapted to installation at floor level, a loading elevator adapted to receive a plurality of cases at working level and to lower the same in sequence into position before a ram, said ram being adapted to sequentially move said cases at substantially floor level into stack forming means including a stacking elevator, said ram also being adapted to discharge a formed stack from the stack forming means at substantially said floor level, said stack forming means including opposed pressure pads adapted to supportingly engage a case in the formation of a stack, means mounting said pressure pads so as to be movable therewith, and means responsive to movement of said mounting means when in engaged, case supporting position to withdraw at least one of said pads from its position of supporting engagement with a case.

7. In a unitary case stacker adapted to installation at floor level, a loading elevator adapted to receive a plurality of cases at working level and to lower the same in sequence into position before a ram, said ram being adapted to sequentially move said cases at substantially floor level into stack forming means including a stacking elevator, said ram also being adapted to discharge a formed stack from the stack forming means at substantially said floor level, said stack forming means including pressure pads adapted to cooperate with said stacking elevator to engage and support the lowermost case in the formation of a stack, means mounting at least one of said pressure pads for movements between an inner case supporting and an outer non-supporting position, said mounting means being carried by the stack forming means so as to be movable with the pressure pads in engaged supporting position, and means responsive to upward movement of said mounting means upon upward movement of a new case into the stack forming means to disengage the pads from such position of supporting engagement.

8. Case stacking apparatus as in claim 7 wherein said means responsive to movement includes a vertically movable swing arm adapted to move a pad between inner case engaging and outer non-supporting positions.

9. Case stacking apparatus as in claim 8 wherein said means responsive to movement also includes an air cylinder, and switch means engageable upon upward movement of said swing arm to reverse said air cylinder.

References Cited in the file of this patent

FOREIGN PATENTS 822,378  Great Britain _____ Oct. 21, 1959